G. E. MERRIMAN.

DIE PRESS.

No. 10,461. Reissued Mar. 11, 1884.

Witnesses.
John Edwards Jr.
Martin A. Pond.

Inventor.
George E. Merriman
By James Shepard
Atty.

N. PETERS. Photo-Lithographer. Washington, D. C.

UNITED STATES PATENT OFFICE.

GEORGE E. MERRIMAN, OF TERRYVILLE, CONNECTICUT.

DIE-PRESS.

SPECIFICATION forming part of Reissued Letters Patent No. 10,461, dated March 11, 1884.

Original No. 282,747, dated August 7, 1883. Application for reissue filed August 25, 1883.

*To all whom it may concern:*

Be it known that I, GEORGE E. MERRIMAN, of Terryville, in the county of Litchfield and State of Connecticut, have invented certain new and useful Improvements in Presses for Metal-Working; and I do hereby declare that the following is a full, clear, and exact description of the invention, which will enable others skilled in the art to which it appertains to make and use the same, reference being had to the accompanying drawings, which form a part of this specification, and in which—

Figure 1:
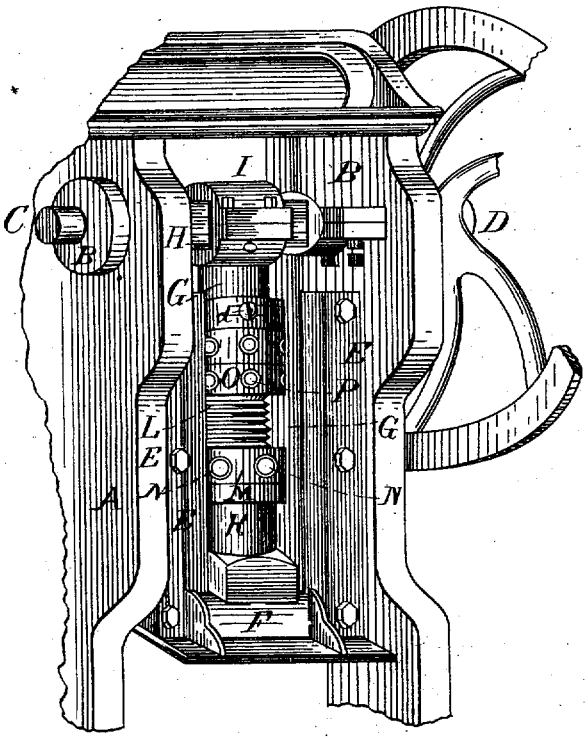
Figure 2:
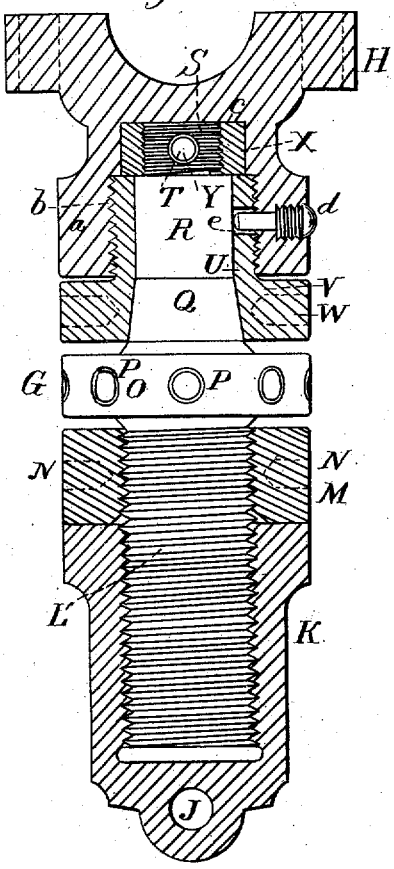

Figure 1 is a perspective view of a portion of a press used in the manufacture of sheet-metal ware provided with my improvement, and Fig. 2 is a longitudinal sectional view of the adjustable pitman.

Similar letters of reference indicate corresponding parts in both the figures.

My invention has relation to presses for manufacturing sheet-metal ware; and it consists in the improved construction and combination of parts of an adjustable plunger-operating pitman adapted to be used in drawing-presses, or cutting, punching, or shearing presses, or any other press in which adjustment of the plunger or platen is desired, as hereinafter more fully described and claimed.

In the accompanying drawings, the letter A indicates a portion of the frame-work of a press, forming bearings B at its upper end for the reception of a transverse crank-shaft, C, having fly-wheel D, and forming vertical guides or ways E, in which the plunger F slides.

G is the adjustable pitman, the upper part or end of which is hinged, by means of a cross-head, H, and cap I, to the crank at its upper end, and at its lower end to the plunger by means of a bolt passing through perforated lugs or plates upon the upper side of the plunger and through a transverse bore in the end of the pitman, all substantially as in ordinary presses. The lower portion of the pitman consists of a part having a female-threaded socket, K, in which turns the adjusting-screw L, the lower end of which is held in place, when adjusted, by means of a locking-nut, M, turning upon the screw and bearing against the upper edge of the part having the socket K. This locking-nut is provided in its outer rim with a series of holes, N, adapted to receive the end of an iron bar serving as a handle when turning the nut. The adjusting-screw has a head, O, which head is provided with a similar series of perforations, P, in its face. This part of the pitman, the head O, and all parts below it are substantially the same as in many presses heretofore known. The changes over prior presses which are wrought by my invention are found in that part of the pitman which is above the head O of the adjusting-screw L, and will now be specifically described. The portion of the screw L which is above the head O consists of a tapering portion, above which is a cylindrical portion, R, surmounted by a screw-threaded portion, S, smaller in diameter than the cylindrical part, and having a transverse perforation, T. A sleeve, U, having a flange, V, at its lower edge and screw-threaded upon the outside, fits over the tapering and smooth cylindrical upper portions of screw L, and the outer rim of the flange V is provided with a series of sockets, W, similar to those in the locking-nut and in the screw-head. A small cylindrical nut, X, is screwed upon the upper screw-threaded end, S, of screw L, and rests with its lower edge upon the upper edge of sleeve U, and is held in place by a pin, Y, passing through perforations in the nut registering with perforation T in the screw. The upper end of the adjusting-screw, with sleeve U and nut X, is inserted into a socket, *a*, projecting from the cross-head H, which socket is screw-threaded at the interior of its lower portion, *b*, fitting over the threaded portion of sleeve U, while its upper portion forms a smooth cylindrical recess, *c*, in which nut X fits and turns. A short screw, *d*, smooth at its inner end, passes through the side of socket *a*, and projects with its smooth end into a short transverse slot, *e*, in the screw-threaded portion of sleeve U, preventing said sleeve from turning more than a small fraction of a revolution. The tapering portion Q, between the cylindrical portion R and the head O, is for the purpose of giving the upper end of the screw-shaft great strength for the size of said upper end. The nut X at the top serves as an annular head for resting upon the upper end of the sleeve U, to prevent the screw from falling, and also for being acted upon by the sleeve U, as hereinafter described. It is made in the form of a nut and pinned on by the pin Y, in order that it may be detached for the purpose of assembling the parts, after which it is secured, and for all practical purposes is the same as if it were made integral with the upper end of the screw L. The sleeve U is for the purpose of temporarily loosening the upper end of the screw, to permit said screw to be rotated for making the desired adjustment, and after the screw has been adjusted and the locking-nut M has been tightened, the sleeve is screwed up to bind the upper end of the screw firmly against an endwise bearing by forcing the annular head or nut X firmly up against the top wall of the recess *c*. The screw *d* is merely to limit the rotation of the sleeve U and prevent it from being unscrewed much more than is necessary to loosen the upper end of the screw for rotating freely in its bearings.

It will now be seen that when it is desired to adjust the pitman, the locking-nut M is loosened and sleeve U unscrewed slightly, which will allow the nut X to turn in its recess, and the entire adjusting-screw with it. When the latter has been adjusted, the locking-nut is screwed down tight against the upper edge of the lower part having the socket K, and sleeve U is screwed up hard against nut X, which presses it and the end of the adjusting-screw up against the top of recess *c*, preventing said screw from turning, and thus holding it in its adjusted position.

Having thus described my invention, I claim and desire to secure by Letters Patent of the United States—

1. The combination of the adjusting-screw L, having lower screw-threaded portion and upper smooth portion, Q R, and annular head or nut X at its upper end, the part having the socket K, socket *a*, female-screw-threaded at its lower portion, *b*, and forming upper cylindrical recess, *c*, and locking-sleeve U, fitting upon the upper portion of the adjusting-screw, screw-threaded on the outside, and turning in the screw-threaded part of socket *a*, and bearing with its upper edge against nut or head X, as and for the purpose shown and set forth.

2. The combination of the lower part having the screw-threaded socket K, adjusting-screw L, having head O, conical portion Q, cylindrical portion R, and screw-threaded end S, having perforation T, cylindrical nut or head X, having perforation-pin Y, locking-nut M, cross-head H, forming socket *a*, having female-threaded portion *b* and cylindrical recess *c*, male-threaded locking-sleeve U, having flange V and slot *e*, and screw *d*, as and for the purpose shown and set forth.

3. The combination of the part having the socket K, the adjusting-screw L, having one end threaded to correspond with the threaded socket, and its opposite end provided with the annular head or nut X, the locking-nut M, adapted to bear against the end of the part having the threaded socket K, the part having the smooth recess, which receives the nut X of the screw L, and the threaded sleeve for acting upon said annular head or nut X, substantially as described, and for the purpose specified.

4. In a pitman, the combination of the adjusting-screw L, the annular head or nut X, the part having the smooth recess, whose top forms a bearing-surface for the upper face of the nut X of the screw L, and the threaded sleeve for acting upon the under side of said annular head or nut X, substantially as described and for the purpose specified.

In testimony that I claim the foregoing as my own I have hereto affixed my signature in presence of two witnesses.

GEO. E. MERRIMAN.

Witnesses:
JAMES SHEPARD,
MARTIN A. POND.